United States Patent
Radosevich

[11] Patent Number: 6,059,344
[45] Date of Patent: May 9, 2000

[54] PICKUP TAILGATE RAMP

[76] Inventor: Vincent Radosevich, 4116 37$^{th}$ Ave. SW., Seattle, Wash. 98126

[21] Appl. No.: 09/373,415

[22] Filed: Aug. 12, 1999

[51] Int. Cl.$^7$ ............................................. B60P 1/43
[52] U.S. Cl. ........................................................ 296/61
[58] Field of Search ........................................ 296/57.1, 61

[56] References Cited

U.S. PATENT DOCUMENTS

| | | | |
|---|---|---|---|
| D. 316,771 | 5/1991 | Murray . | |
| D. 354,603 | 1/1995 | Bullard . | |
| D. 360,729 | 7/1995 | Collins . | |
| D. 398,129 | 9/1998 | Sackes et al. . | |
| 3,339,968 | 9/1967 | Hall | 296/61 |
| 3,510,015 | 5/1970 | Roshaven | 296/61 |
| 3,976,209 | 8/1976 | Burton . | |
| 4,098,414 | 7/1978 | Abiera . | |
| 4,795,304 | 1/1989 | Dudley . | |
| 5,273,335 | 12/1993 | Belnap et al. . | |
| 5,287,579 | 2/1994 | Estevez | 296/61 |
| 5,540,474 | 7/1996 | Holland | 296/61 |
| 5,553,762 | 9/1996 | Brown . | |
| 5,810,546 | 9/1998 | Schmoling . | |
| 5,813,714 | 9/1998 | Lipinski et al. | 296/61 |
| 5,907,276 | 5/1999 | Lance . | |

*Primary Examiner*—Gary C. Hoge

[57] ABSTRACT

A ramp system for loading wheeled vehicles, equipment, or articles onto a pickup truck or trailer. A ramp or set of ramps which provide a roadway or skidway between ground level and a truck bed and which additionally provides a solid path over the tailgate and the gap between the tailgate and truck bed, thence into the bed. The ramp system folds to fit within a pickup truck bed for storage and transportation. The ramp further comprises a clamping system which grips the tailgate as it is put into position.

3 Claims, 3 Drawing Sheets

PICKUP TAILGATE RAMP

BACKGROUND OF THE INVENTION

1. Field of Invention

Ramp devices for loading wheeled vehicles into the bed of a truck or trailer. In particular, locking devices on such ramps to prevent accidental release of the ramp from the vehicle.

2. Description of Prior Art

In the past, the tailgates of pickup type trucks lowered to a vertically hanging position and ramps could be hooked onto the hinged edge of the tailgate or directly to the truck bed. Recent designs of pickup trucks permit the tailgate to be lowered only to approximately horizontal or slightly lower position. There is no provision or design feature that permits attaching accessories such as a set of ramps to the tailgate. Furthermore, there is a significant gap between the tailgate and the truck bed over which a load has to be slid or carried.

Loading ramps for pickup trucks may be classified in several functional groupings:

A. Ramp systems where the tailgate or equivalent takes no part in the loading of the truck. These are where either the tailgate is removed, dropped below the ramp, or the ramps pass over the tailgate without co-operative interaction. These are different in form, function, and way used from the present invention. U.S. Pat. Nos. 5,553,762 and 5,810,546 and D 360,729 and D 398,129 and D 354,603 are typical of this type of ramp system. Many modern trucks are designed so that the tailgate cannot be lowered below horizontal position, precluding dropping it out of the way. Ramp systems that pass over the tailgate in closed position place the load high on the truck which can cause unstable operation of the truck while driving.

B. Ramps systems that connect to the free edge of the tailgate, bumper, or some part of the truck, but where the load is rolled directly on the tailgate surface. This subjects this surface of the tailgate to denting and paint marring. These, also, require rolling the load over the gap between the tailgate and the bed. Attaching to the free end of the tailgate requires either modification of the tailgate or installation of a harness device to which the ramps attach directly. U.S. Pat. Nos. 4,795,304 and 4,098,414 and 3,976,209 and D 316,771 are typical of tailgate edge mounted loading ramps. These all require modification to the truck to install the ramp systems.

The present invention requires no removing of parts, and no drilling, cutting, or any permanent fastening to the truck. The present invention does not require modification to the truck to attach the ramp, and the load is rolled over a portion of the ramp system positioned to protect most of the tailgate from any damage.

C. Ramp systems which convert between a ramp function and a tailgate function. This type of system usually uses either telescoping or unfolding to extend the ramp for use. U.S. Pat. Nos. 5,907,267 and 5,273,335 are typical examples. Ramps of this type require removal and replacement of the original equipment tailgate. The present invention does not require removal of the original tailgate.

Ramps that fold or telescope in the middle to shorten them for storage inherently have a weak spot at the joint. A hinge, telescoping, or bolted joint in the sloping portion of a ramp is required to resist considerable bending moments because he bending moment of a ramp with simple end supports is maximum at the center. This type of design requires either the loads be severely limited, external supports be provided, or that the ramps be heavy structures. The present invention has a hinged clamp at one end of the sloping ramp portion. Here the bending strength requirement is less than in the middle of a simply supported ramp.

Some ramps may be classified in more than one of the above groupings, however, that does not negate the analysis of their form, function, and way of use.

None of the references cited acknowledge that there is a gap between the original equipment tailgate and the truck bed, and of course, none teach any means to overcome having to roll the load over such a gap. U.S. Pat. No. D 360,729, by Gary B. Collins, and U.S. Pat. No. 5,810,546, by Ralph Schmoling, ignore the problem, but also appear to avoid the problem by installing a secondary bed or rack designed specifically for the intended load. Collin's has a track/frame assembly for carrying an ATV (All Terrain Vehicle) and includes specific tie-down rings. Schmoling's has a general frame and a contoured set of frames carrying rollers for loading and supporting a boat. Neither use any part of the truck directly for supporting the load, thus they passed over the gap without having to consider it. U.S. Pat. No. 5,273,335, by Philip Belknap, has what at first appears to be a cover over the gap. Upon closer examination, plate (44) is not a gap cover, but a ramp leading down from the ramp/tailgate structure. This is required in the Belknap design because the original tailgate was replaced by the combination ramp/tailgate attached inside, and above, the truck bed. Belknap's design also makes an extra and objectionable drop into the truck. Conversely, a lift is required to move the load from the bed to the Belknap ramp.

Objects of the Invention

It is an object of the invention to provide a ramp or set of ramps to load vehicles, equipment, or objects onto a truck, or trailer, which is equipped with a tailgate that drops into a position coplanar or very nearly coplanar with the bed of the truck, or trailer.

It is a further object of the invention to provide secure, but removable attachment of a ramp to a vehicle to prevent accidental dropping of the equipment being loaded.

It is a further object of the invention that the ramps be easily installed and removed without the use of tools.

It is a further object of the invention that the ramps span the gap between the truck tailgate and the truck cargo bed and that the ramp protect the tailgate inner surface from damage incidental to loading.

It is a further object of the invention that means such as curbs be provided to prevent a vehicle being loaded into the truck from running off the ramps.

It is a further object of the invention that the invention be foldable to fit within a standard pickup truck bed for stowage and transportation.

SUMMARY OF THE INVENTION

A ramp system for loading wheeled vehicles, equipment, or articles onto a pickup truck or trailer.

A ramp or set of ramps is placed on the horizontally extended tailgate of a pickup truck where one portion traverses the tailgate and the gap between the tailgate and the truck bed, and the other portion slopes downward from the end of the tailgate to the ground.

This invention is particularly suited for loading small wheeled equipment such as lawn mowers, small tractors, cultivators, wheelbarrows, light motorcycles, and the like into a pickup truck. Nothing in the design precludes it from being designed for heavier equipment, ATV's, barrels, farm tractors, hoes, small bulldozers and the like.

The ramp assembly is hinged at a location close to the outer edge of the tailgate forming two portions, the sloping ramp, and a roadway over the tailgate and the gap between the tailgate and the truck cargo bed. The roadway bridges the gap and provides a solid track over the tailgate panels thus avoiding both structural and paint damage to the tailgate inner surface and having to carry the vehicle or article being loaded over the gap.

The ramp further comprises a clamping system that automatically grips the tailgate firmly when the sloping portion is placed on the ground. This prevents the ramp from shifting which can cause the vehicle or article being loaded to be dumped off the ramp.

The ramp system further comprises a set of curbs to guide wheeled vehicles over the ramp.

A feature of the ramp system is foldability to fit within a pickup truck bed for storage and transportation.

No other design for ramps has been found that locks onto a tailgate and provides a firm surface over the gap between the tailgate and the bed.

DETAILED DESCRIPTION OF THE PREFERRED EMBODIMENT

Figure 1:
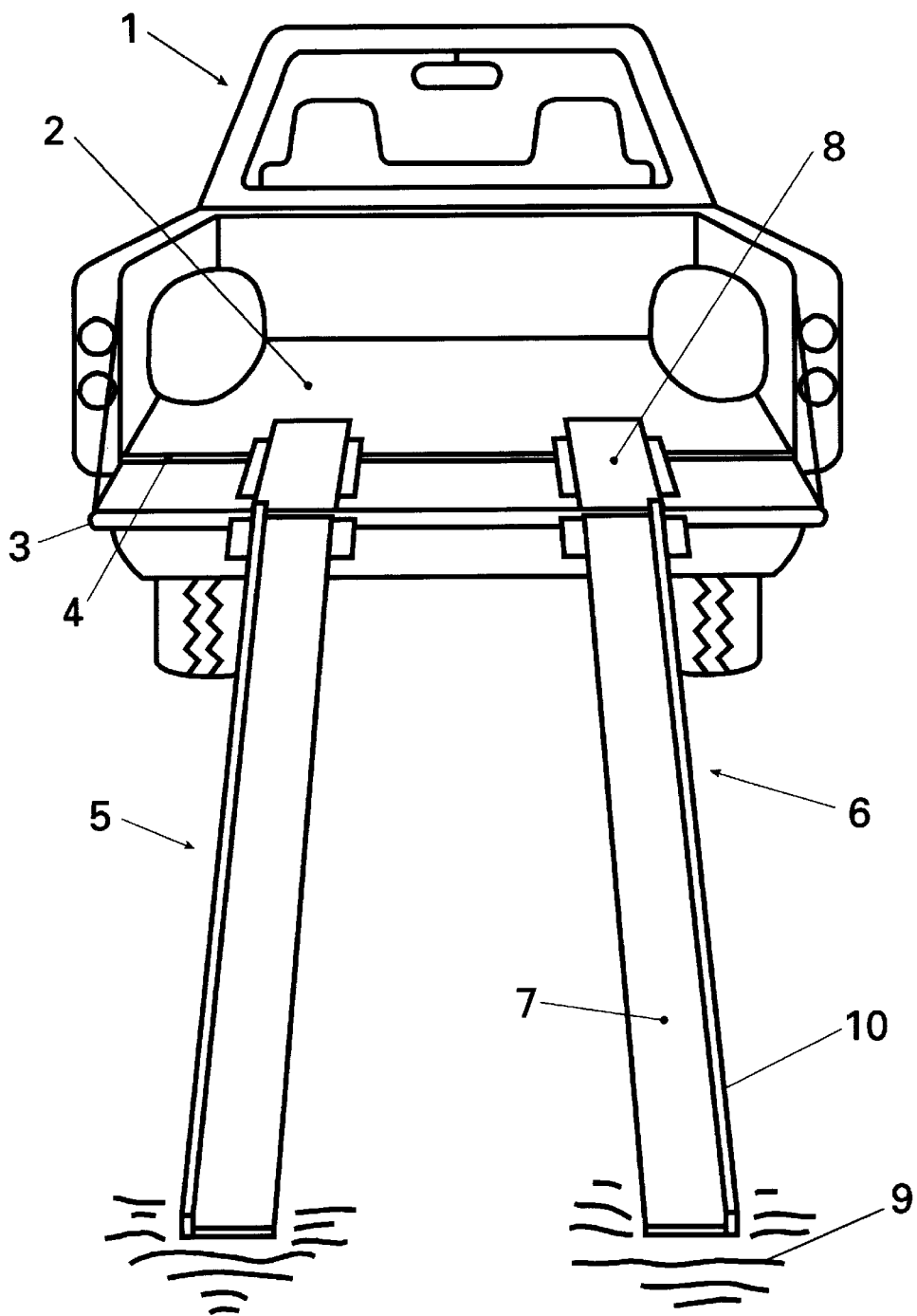
FIG. 1 shows the invention in place on the back of a pickup truck.

Referring to FIG. 1, truck 1, is readied for loading by lowering the tailgate 3, and ramps 5 and 6 are, deployed where the front portion 8 of the ramp overlays the tailgate and the gap 4 between the tailgate and the truck cargo bed 2. The front portion 8 extends into the cargo bed 2 sufficiently far to provide load bearing support for the ends.

Figure 2:
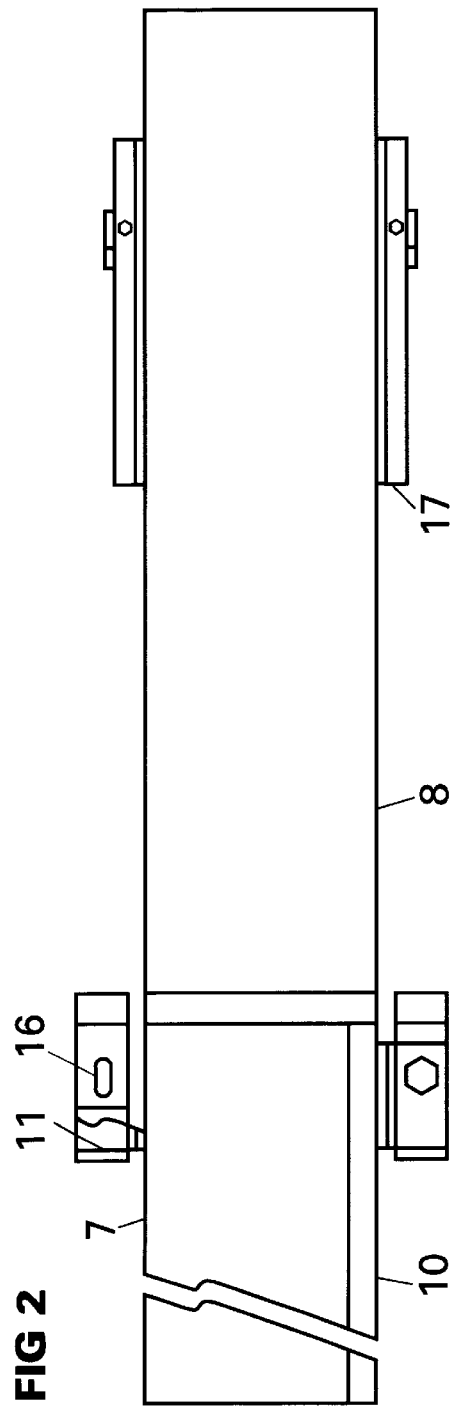
FIG. 2 is a plan view of the invention showing the clamping feature.
Figure 3:
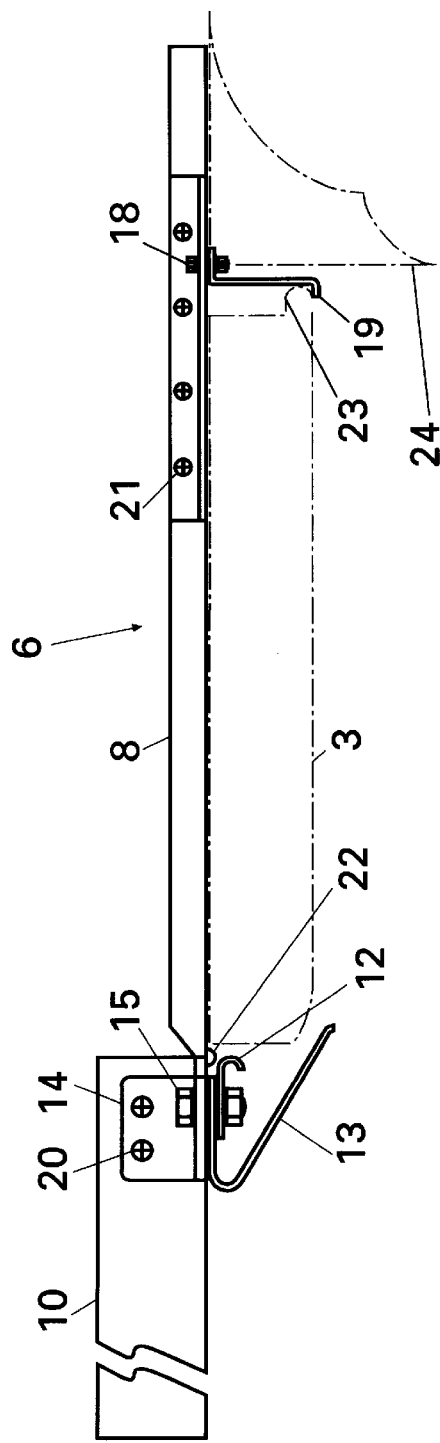
FIG. 3 is an elevation view of the invention showing the ramp extended horizontally and the clamping feature in the non-gripping position.

Referring to FIG. 2, ramp 6, includes a front portion 8, a rear portion 7, a curb 10, and a tailgate gripping safety clamp comprised of bumper 12, prong 13, and hook 19. The ramps are deployed as one wide ramp (not shown), two narrow ramps, or three narrow ramps, (not shown) where the middle ramp is for special uses such as to carry the front wheel of a tricycle vehicle. A middle ramp may have 1, 2, or no curbs.

The preferred embodiment, FIG. 1, is a pair of ramps designed as left and right mirror images approximately 6 inches wide and having a length determined by the target truck. Describing one ramp in detail consequently adequately describes the other.

Various trucks having various sizes requires the tail gate portion to be somewhat customized for fit. The sloping portion should be between 30 and 45 degrees slope on level ground. At 45 degrees, the force required to roll an article up the ramp is 71% of its weight, and the supported weight is the same. At 30 degrees, the force is sine 30 degrees, or 50% and the supported weight is 87%. At 60 degrees, the force and weigh figures are reversed. Longer ramps having lower slopes become unwieldy in length and the structural strength, hence the weight of the ramp, required is also increased.

Front portion 8, rear portion 7, and curb portion 10 comprise the roadway for moving articles from the ground 9 to the truck bed 2. The curbs prevent running off the sides of the ramps. The curbs may also provide structural stiffness.

Hinge 22, together with the slotted hole, 16, in bumper 12, shown in FIG. 2, permits the ramp to be adjustable for local conditions and to permit folding the front ramp portion back against the rear ramp portion to shorten the assembly during storage.

Clamp parts, bumper 12 and prong 13, on the curb side are shown fastened with nut and bolt 15 to the curb with bracket 14, which in turn is fastened with screws 20 to the curb, equivalent alternate fastening means is anticipated. The bracket 11 for the clamp parts on the opposite side is fastened directly to the ramp structure. Bumper 12 is positioned so that its nose is approximately opposite or slightly forward of the hinge line. This provides adequate forward travel to clamp the tailgate without significant vertical motion, which would scratch the tailgate paint. Bumper 12, prong 13, hook 19, and any other truck-contacting parts may be coated with an anti-mar finish such as a vinyl sleeving or similar.

Brackets 17 each support a hooked or rear-ward projecting end hook 19, which passes under the inner edge of the tailgate to prevent the front portion 7 of the ramp from lifting due to the moment applied from the weight of the load to the small projection beyond the tailgate to the hinge 22. The distance between bumper 12 and hook 19 is set to be the width of the tailgate. This prevents front to back movement of the ramp.

Figure 4:
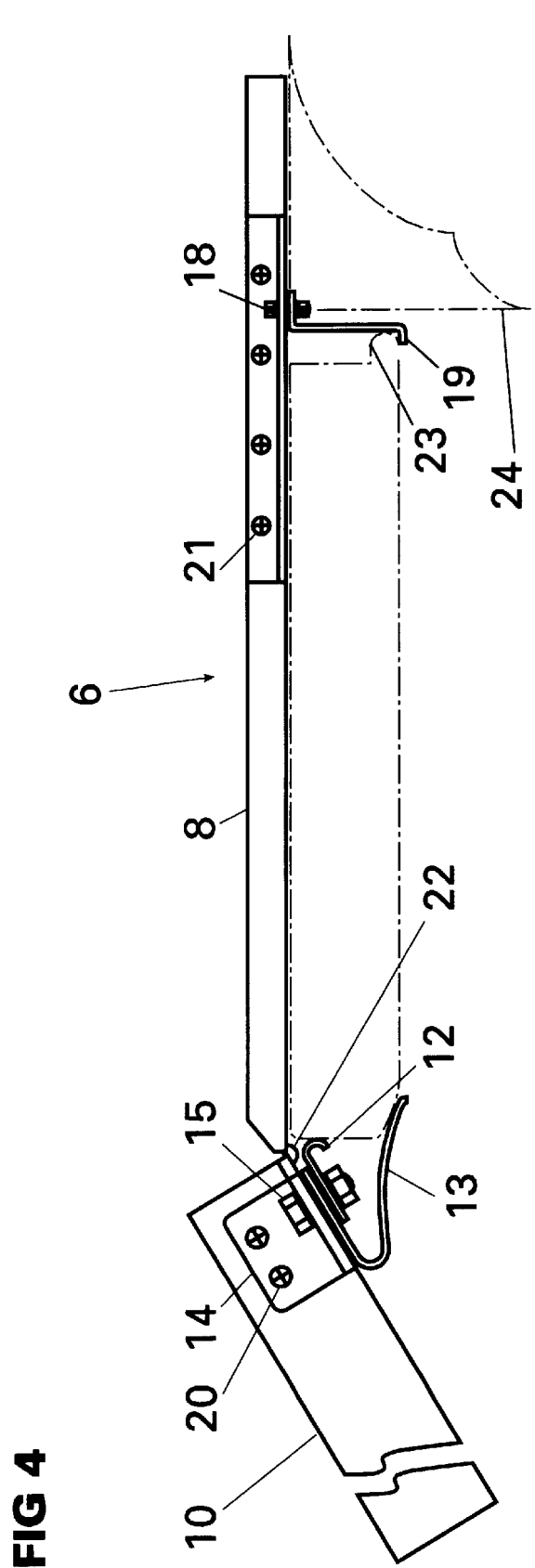
FIG. 4 is an elevation view of the invention showing the ramp lowered and showing the clamping feature in the locked position.

FIG. 4 shows the prong 13, to be pressing against a sloping portion of the tailgate 3. Prong 13 presses onto the edge of the tailgate to prevent the hinged region of the ramp from lifting from the tailgate. Prong 13 may extend beyond any sloping or curving portion and over the essentially flat portion of a tailgate.

The ramps can be fabricated using any of several techniques from simple wood planking to metallic truss structures.

When the ramp has flexibility, as is the case with wood planking, the bowing of the plank caused by the weight of the article being loaded rotates the mounting of prong 13, thereby causing prong 13 and bumper 12 to grip more tightly.

Alternative Embodiments and Accounterments

For some applications, two curbs on each ramp may be found desirable.

For some applications, the curbs may be removable or alternatively placed on the underside as strengthening ribs.

An additional hinge (not shown) may be included on the ramp extension portion 7 to permit further folding and shortening the assembly for storage. This would, of course, increase the weight and complexity of the invention.

The forward hook 19 may be adjustable by providing slots or a series of holes and slots to accommodate optional placement of its fastening bolts to accommodate a variety of tailgate front to back dimensions. Tailgate depths can also be accommodated with adjustable fastening systems.

The figures show the fastening methods to be bolting. Welding or riveting of the fixed parts are equally acceptable.

Prong 13 may be part of an assembly having a separate spring for automatically adjusting prong 13's grip.

Bumper 12 may be part of an assembly having a separate spring for automatically adjusting bumper 12's grip.

How to use the Invention

Referring to FIG. 1, truck 1, is readied for loading by lowering the tailgate 3, and ramps 5 and 6 deployed where the front portion 8 of the ramp overlays the tailgate and the gap between the tailgate and the truck bed 2, extending into the truck bed 2. The extending portion of the ramp 7 is lowered to the ground, causing the clamp bumpers 12 and prongs 13 to grip the outer edge of the tailgate and pulling inner clamp prong 19 against the inner edge of the tailgate. Bumper 12, prong 13, and hook 19 comprise a clamping system which securely latches the ramp to the tailgate.

Curb 10 is provided to guide the movement of the article being loaded and to prevent dumping the load off the ramp. Generally, the curbs are placed on the outside as shown in FIG. 1, however, when circumstances warrant, placing them on the insides of the pair is a satisfactory alternative.

When finished, the ramp extensions are lifted to unlock the clamps and the ramp assembly is removed from the tailgate. It is then folded back upon itself for storage in the truck bed.

Thus, it is apparent that there has been provided in accordance with the invention, a truck loading ramp that fully satisfies the objects, aims, and advantages set forth above.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as defined by the claims which follow.

The embodiments of the invention in which an exclusive property right or privilege is claimed are defined as follows:

I claim:

1. A loading ramp for a vehicle having a horizontally hinged tailgate mounted to the rear edge of a cargo bed comprising:
    a. a generally planar elongated rectangular ramp member extending generally between the tailgate and a ramp receiving surface, and a generally planer elongated rectangular traversing member for traversing the tailgate and extending into the rear portion of said cargo bed, and each member having a long axis and a short axis, and each member having an upper and lower surface, and each member having long edges on opposite ends of said short axis, and each member having an inner end edge and an outer end edge on opposite ends of said long axis; and,
    b. a hinge connecting said ramp member and said traversing member, said hinge being attached to said inner end edges of each member's short axis, and;
    c. said traversing member further comprising a hook member near the outer end edge and extending from said lower surface to under said tailgate; and,
    d. said ramp member further having a clamping force applying means comprising a bumper for applying thrust to the tailgate, thereby clamping the tailgate between said bumper and said hook member; and,
    e. said ramp member further having tailgate clamping means comprising a prong on the lower surface of said ramp member extending forward beyond said hinge whereby when said ramp is lowered, said prong rises and clamps the ramp member to the tailgate.

2. The loading ramp of claim 1 further comprising at least one curb attached to a long edge of the ramp member.

3. The loading ramp of claim 1 further comprising no curb, 1 curb, or 2 curbs attached to a long edge or edges of the tailgate traversing member.

* * * * *